US010277603B2

(12) United States Patent
Ainscow

(10) Patent No.: US 10,277,603 B2
(45) Date of Patent: Apr. 30, 2019

(54) METHOD FOR SECURE ACCESS TO A NETWORK RESOURCE

(71) Applicant: SOLUS PS SDN BHD, Kuala Lumpur (MY)

(72) Inventor: Matthew Robert Ainscow, Bangkok (TH)

(73) Assignee: SOLUS PS SDN BHD, Kuala Lumpur (MY)

( * ) Notice: Subject to any disclaimer, the term of this patent is extended or adjusted under 35 U.S.C. 154(b) by 0 days.

(21) Appl. No.: 15/469,577

(22) Filed: Mar. 27, 2017

(65) Prior Publication Data
US 2017/0359352 A1    Dec. 14, 2017

(30) Foreign Application Priority Data

Jun. 14, 2016   (MY) .......................... UI 2016702185

(51) Int. Cl.
*H04L 29/06*   (2006.01)

(52) U.S. Cl.
CPC .......... *H04L 63/102* (2013.01); *H04L 63/083* (2013.01); *H04L 63/0861* (2013.01); *H04L 63/0884* (2013.01); *H04L 2463/082* (2013.01)

(58) Field of Classification Search
CPC . H04L 63/102; H04L 63/083; H04L 63/0861; H04L 63/0884; H04L 2463/082
See application file for complete search history.

(56) References Cited

U.S. PATENT DOCUMENTS

| 2002/0038426 | A1 | 3/2002 | Pettersson et al. |
| 2003/0093554 | A1* | 5/2003 | Wolfe ................ G06Q 20/203 709/238 |
| 2007/0038313 | A1* | 2/2007 | Bridges ................. H04N 1/00 700/17 |
| 2007/0220594 | A1 | 9/2007 | Tulsyan |
| 2008/0249947 | A1 | 10/2008 | Potter |
| 2008/0313730 | A1* | 12/2008 | Iftimie .................. G06F 21/40 726/17 |
| 2009/0265544 | A1* | 10/2009 | Moona ................. G06F 21/34 713/156 |
| 2011/0085654 | A1* | 4/2011 | Jana ..................... H04L 12/66 379/220.01 |
| 2012/0174194 | A1* | 7/2012 | Furukawa ........... G06F 21/604 726/4 |
| 2012/0303401 | A1* | 11/2012 | Tolgu ................... G06Q 10/06 705/7.13 |
| 2014/0273958 | A1* | 9/2014 | Messana ............ H04L 63/0884 455/411 |

(Continued)

Primary Examiner — Ghodrat Jamshidi
(74) Attorney, Agent, or Firm — Wayne & Ken, LLC; Tony Hom

(57) ABSTRACT

The present invention provides a method (500) for secure access to a network resource (150), comprising the steps of receiving a selection of a workflow from the set of workflows, made by a user, from a first client device (160), obtaining a user identifier from the user and a resource key and an interface key from the first client device (160), verifying the user with the user identifier and verifying the network resource (150) with the resource key and the interface key and executing a plurality of activities comprised within the workflow on successful verification of the user and the network resource (150).

1 Claim, 7 Drawing Sheets

(56) References Cited

U.S. PATENT DOCUMENTS

| | | | |
|---|---|---|---|
| 2015/0118994 A1* | 4/2015 | Shin | H04W 8/18 |
| | | | 455/410 |
| 2015/0215278 A1* | 7/2015 | Stone | H04L 67/146 |
| | | | 709/223 |
| 2017/0034155 A1* | 2/2017 | Khalil | H04L 63/102 |
| 2018/0095984 A1* | 4/2018 | Ngo | G06F 17/30117 |

* cited by examiner

METHOD FOR SECURE ACCESS TO A NETWORK RESOURCE

CROSS-REFERENCE OF RELATED PATENT APPLICATION

The present application claims priority under the Paris Convention to the Malaysia utility innovation application no.: UI 2016702185 filed on Jun. 14, 2016; the disclosure of which is incorporated herein by reference in its entirety.

TECHNICAL FIELD

Embodiments of the present invention relate to user authentication systems and methods and more particularly, to a method for secure access to a network resource therefor.

BACKGROUND

A network resource is an important tool for collection and dissemination of data in a collaborative environment, such as an organization. However, the data being managed may be of confidential nature and it is important for the organization to which the data belongs, to ensure data security. Any loss of such data may lead to reputation and/or revenue loss for the organization and in some cases may even lead to regulatory impacts.

A conventional method to ensure data security is use of a user identifier and a password for granting access to the network resource. The user identifier and the password are unique to each user trying to gain access to the network resource. However, a single password does not provide enough security, as the passwords are prone to being stolen through hack attacks, such as Man-In-The-Middle (MITM) attacks. Moreover, even if the password is not stolen, the data security is heavily dependent on the strength of the password. The strength of the password is in turn dependent upon the skill of the user to generate a secure password.

There have been a number of solutions provided for secure authentication of a user and one of them has been discussed below:

US20080249947A1 discloses a multi-factor authentication system using a one-time password. During a transaction, a one-time password is generated and associated with the user. The one-time password is then provided to the user through an automated teller machine. The network resource then authenticates the user on receiving the one-time password from the user.

US20070220594A1 discloses a software based method for secure access to a network resource. The method comprises collecting static and dynamic attributes associated with a user. Encrypting the static and dynamic attributes to generate a key string and transmitting the key string to the network resource. The network resource then decrypts the key string to authenticate the user.

US20020038426A1 discloses a method and system for authenticating a user using biometric information. The biometric information is collected at a client device and transmitted to a server. The server then verifies the biometric information with a record maintained at the server. On successful verification of the biometric information, the server generates a random password and sends it back to the client device. The user is then authenticated at the client device with the random password.

The aforesaid documents and other solutions may strive to provide secure systems and methods for secure access to a network resource. However, they still have a number of shortcomings and limitations. For example, the systems and methods in each of the aforesaid documents cater only to a single network resource. Further, they only provide a single additional layer of protection to a standard method of password based verification. Also, they do not provide enough flexibility to a network resource to set up its own individual authentication policy.

Accordingly, there remains a need in the prior art to have a method for secure access to a network resource which overcomes the aforesaid problems and shortcomings.

However, there remains a need in the art for a secure access method thereof which provides multi-tenancy, multiple factor authentication and allows a network resource to design its own individual authentication policy.

SUMMARY OF THE INVENTION

Embodiments of the present invention aim to provide a method for secure access to a network resource. The method enables multi-tenancy and flexibility for the network resource to design its own individual authentication policy.

Embodiments of the Present Invention are Made Possible in this Way:

A method for secure access to a network resource, comprising the steps of receiving a user identifier corresponding to a user, from the network resource and storing the user identifier in a database, assigning a set of workflows to the user, assigning a resource key to the network resource and associating the network resource with an interface key, receiving a selection of a workflow from the set of workflows, made by a user, from a first client device, obtaining the user identifier from the user and a resource key and an interface key from a first client device, verifying the user with the user identifier and verifying the network resource with the resource key and the interface key and executing a plurality of activities comprised within the workflow on successful verification of the user and the network resource. Further, the plurality of activities comprises at least one of receiving a password from the user, receiving at least one biometric parameter from the user and providing the at least one biometric parameter to an authentication service and receiving an authentication key from the user.

As Compared to the Conventional Methods for Secure Access, the Advantages of the Present Invention are:

First, the same instance of the method can be used to access a plurality of network resources, thus allowing multi-tenancy. It also provides an option of Single Sign-On (SSO) for granting access to the plurality of network resources. Further, each one of the plurality of network resources can design their own, individual authentication policy. Further, the authentication policy may include a single, double or a multi-factor authentication.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawing illustrates only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE INVENTION

Figure 1:
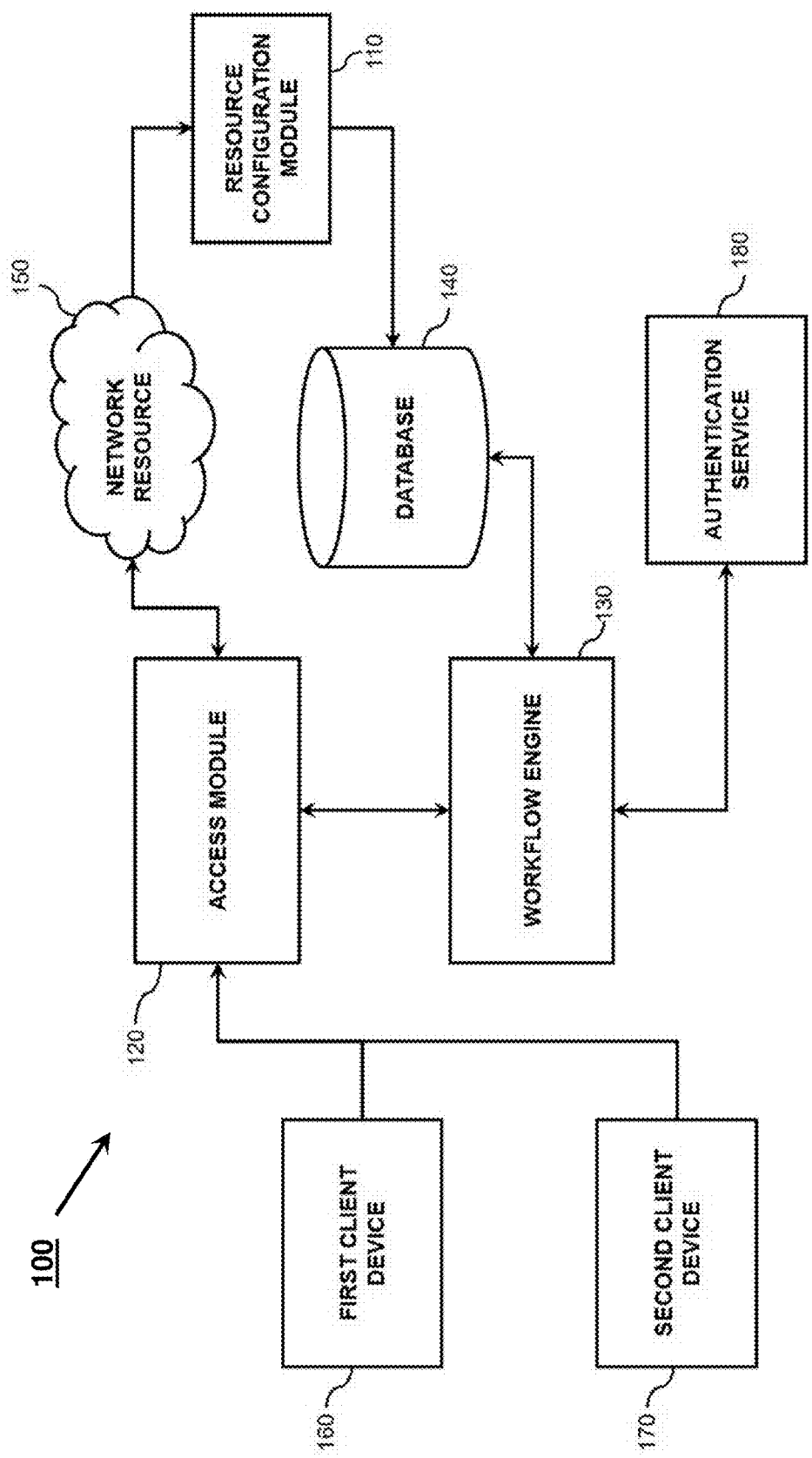
FIG. 1 illustrates a system for secure access to a network resource in accordance with an embodiment of the present invention.

Referring to the drawings, the invention will now be described in more detail. In accordance with an embodiment of the present invention, a system (100) for secure access to a network resource (150) as shown in FIG. 1 comprises a resource configuration module (110), an access module (120), a workflow engine (130) and a database (140).

In accordance with an embodiment of the present invention, the network resource (150) is, but not limited to, a web based network resource, such as a domain database or a web based service. Alternately, the network resource (150) is a datacenter or a service available on a local network within an enterprise. Further, the network resource (150) is a secure network resource and has a policy for granting access to a plurality of users.

During generation of the policy, a user from the plurality of users is assigned a user identifier by the network resource (150). The resource configuration module (110) is configured to receive the user identifier corresponding to the user from the network resource (150) and store the user identifier in the database (140). Further, the resource configuration module (110) is configured to assign a set of workflows to the user for enrolment and authentication events. In accordance with an embodiment, the user is assigned a workflow for an enrolment event and a workflow for authentication event. Alternately, the user is assigned an additional workflow in accordance with a task undertaken by the user. For example, for viewing of data, the user is authenticated with a first workflow, whereas for editing of data, the user is authenticated with a second workflow. Each workflow from the set of workflows comprises a plurality of activities. Every activity from the plurality of activities, adds another layer of security while granting access to the network resource (150).

Further, the resource configuration module (110) is configured to assign a resource key to the network resource (150). The resource key is a unique key defined for identification of the network resource (150) and stored at the database (140). The resource key is also stored at a first client device (160) during configuration of the first client device (160). The resource configuration module (110) is further configured to associate the network resource (150) with an interface key. The interface key is a unique key corresponding to the workflow engine (130) and stored at the database (140). During the configuration of system (100) for the network resource (150), the network resource (150) is associated with the interface key. The interface key allows the network resource (150) to activate the workflow engine (130). During the configuration of the first client device (160) the interface key also is stored at the first client device (160).

In accordance with an embodiment of the present invention, the access module (120) is provided at, but not limited to, the first client device (160) and a second client device (170). In accordance with an embodiment of the present invention, the first client device (160) is one of, but not limited to, a personal computer, a mobile phone, a tablet and a personal digital assistant. Similarly, the second client device (170) is one of, but not limited to, a personal computer, a mobile phone, a tablet and a personal digital assistant.

The access module (120) is configured to receive the selection of a workflow from the set of workflows, made by the user, using the first client device (160). Further, the access module (120) configured to obtain the user identifier from the user. Further, the access module (120) is configured to obtain the resource key and the interface key from the first client device (110). Further, the access module (120) is configured to provide the user identifier, the resource key, the network key to the workflow engine (130).

Further, the access module (120) is configured to receive a password, at least one biometric parameter and an authentication key from the user. The access module (120) receives the password, the at least one biometric parameter and the authentication key in accordance with the workflow selected by the user. For example, the workflow may necessitate receiving only of the password. Alternately, the workflow may necessitate receiving of the password and the authentication key.

In accordance with an embodiment of the present invention, the password is received at, at least one of the first client device (160) and the second client device (170). Further, in accordance with an embodiment, the at least one biometric parameter is received at, at least one of the first client device and the second client device. Further, the at least one biometric parameter is one of but not limited to, a fingerprint scan, a retina scan, a sclera scan and a plurality of behavioural characteristics of the user. The access module (120) is further configured to provide the password and the at least one biometric parameter to the workflow engine (130).

Also, in accordance with an embodiment of the present invention, the authentication key is received at, at least one of the first client device (160) and the second client device (170).

Figure 2:
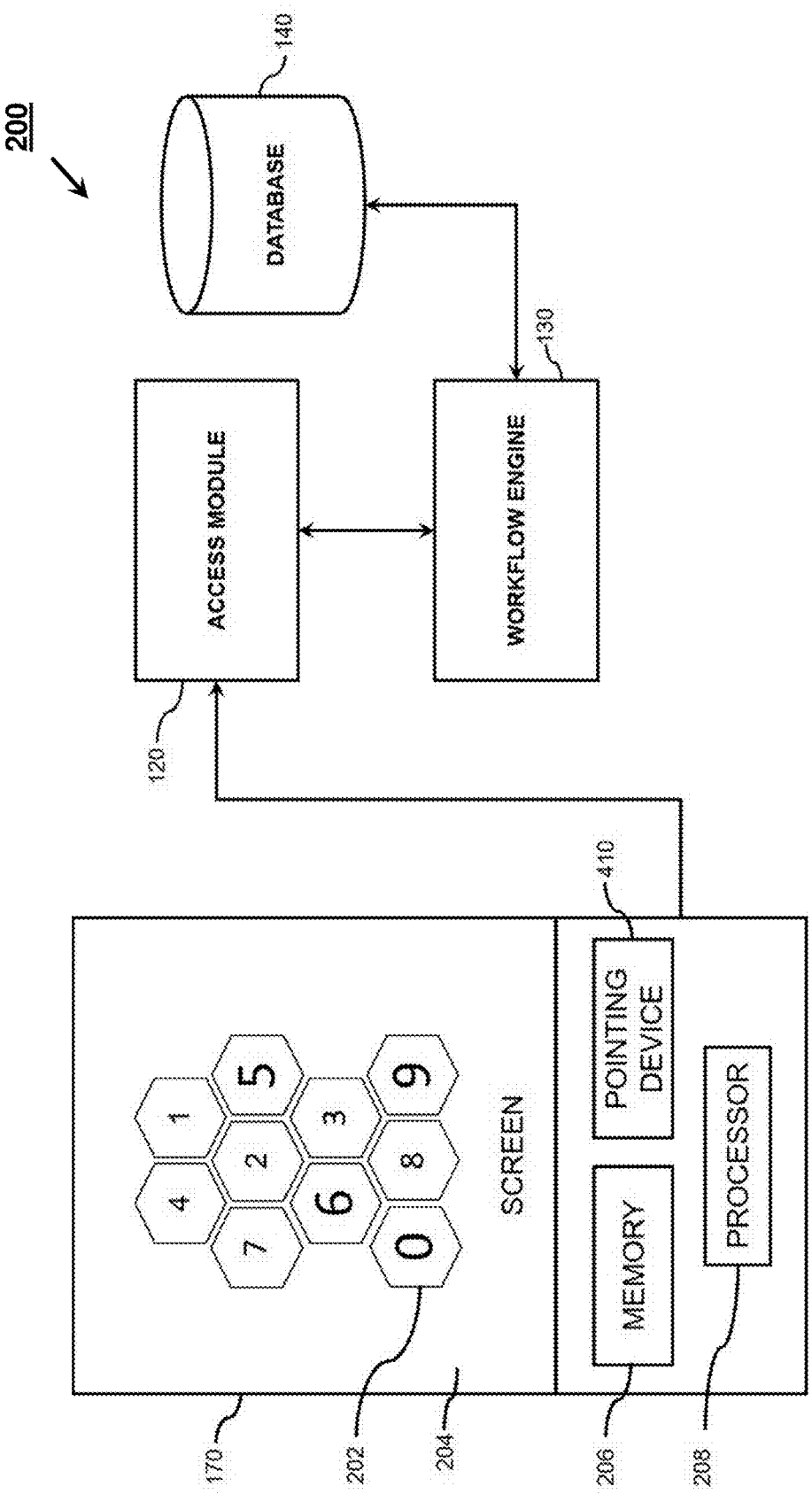
FIG. 2 illustrates the system for secure access to the network resource adapted for receiving an authentication key in accordance with another embodiment of the present invention.

FIG. 2 illustrates the system (100) for secure access to the network resource (150) adapted for receiving the authentication key at the second client device (170) in accordance with another embodiment (200) of the present invention. In accordance with the embodiment, the second client device (170) comprises a screen (204), a memory (206), a processor (208) and a pointing device (210). The screen (204) is, but not limited, an LCD screen or an LED screen. Further, the pointing device (210) is one of but not limited to, a capacitive touch, a trackball, a mouse and a joystick.

The access module (120) is configured to display a plurality of keys (202) on the screen (204) in a random order. The plurality of keys (202) are displayed on the screen (204) having a shape of, but not limited to, a dial. Alternately, the plurality of keys (202) are displayed in a form of, but not limited to, a tree structure. In accordance with an embodiment of the present invention, the plurality of keys (202) are displayed on the screen (204) as an image map. The plurality of keys (202) are assigned a set of a plurality of respective regions on the screen (204). The x-y coordinates of the plurality of regions defining the plurality of respective keys (202) are stored in the memory (206).

Further, the access module (120) is configured to receive the authentication key having a predetermined number of characters. In accordance with an embodiment, the predetermined number of characters are, but not limited to, alphanumeric characters. Alternately, the predetermined number of characters comprise special characters. The predetermined number of characters are entered using the pointing device (210). When the user selects a specific area of the screen (204) with the pointing device (210), the x-y coordinates of the specific area are compared with the x-y coordinates of the plurality of regions defining the plurality of respective keys (202) to determine a character entered by the user. Further, the access module (120) is configured to shuffle the random order on receiving each character from the predetermined number of characters, i.e., the plurality of keys (202) are assigned a new set of the plurality of respective regions. The process is repeated after receiving of each character from the predetermined number of characters.

In accordance with an embodiment of the present invention, the access module (120) is further configured to erase the plurality of keys (202) from the screen (204), when a character from the predetermined number of characters is not received for a predetermined period of time.

In accordance with an embodiment of the present invention, the access module (120) is configured to hash the authentication key to obtain a hash value. In accordance with an embodiment, the authentication key has between four and nine characters. The number of characters in the authentication key is determined by a developer or the user. The authentication key is extrapolated by the access module (120) into the hash value using a salt and a hashing algorithm. The salt is added to the authentication key to obtain a resultant string. The resultant string is then hashed using the hashing algorithm. The hashing algorithm is one of, but not limited to, MD5 or SHA etc. Alternately, the hashing algorithm is defined by the developer. In accordance with an embodiment, the hash value has a length of fifty characters. In accordance with an embodiment of the present invention, the access module (120) is configured to store the hash value at the memory (206). In accordance with another embodiment, the access module is configured to provide the hash value to the workflow engine (130).

In accordance with an embodiment of the present invention, the access module (120) is further configured to provide an access to the network resource (150), to the user, on successful verification of the user, corresponding to each one of the plurality of activities comprised within the workflow.

The workflow engine (130) is configured to receive the user identifier, the resource key and the interface key from the access module (120). Further, the workflow engine (130) is configured to verify the user with the user identifier. The user is verified by mapping the user identifier with the database (140). The workflow engine (130) is also configured to verify the network resource (150) with the network key and the interface key, by mapping the network key and the interface key with the database (140).

Further the workflow engine (130) is configured to execute the plurality of activities comprised within the workflow, on successful verification of the user and the network resource. The plurality of activities comprises at least one of receiving the password from the user, receiving the at least one biometric parameter from the user and providing the at least one biometric parameter to an authentication service (180) and receiving the authentication key from the user. It is to be noted that the password, the at least one biometric parameter and the authentication key are received by the access module (120) from the user. The workflow module (130) only prompts the access module (120) to receive the password, the at least one biometric parameter and the authentication key from the user. Further, the at least one biometric parameter is provided to the authentication service (180) by the workflow engine (130), on receiving the at least one biometric parameter from the access module (120).

In accordance with an embodiment, on unsuccessful verification of at least one of the user and the network resource, the workflow engine (130) is configured to flag an error message to the access module (120). The access module (120) is then configured to display the error message to the user at, at least one of the first client device (160) and the second client device (170).

Figure 3:
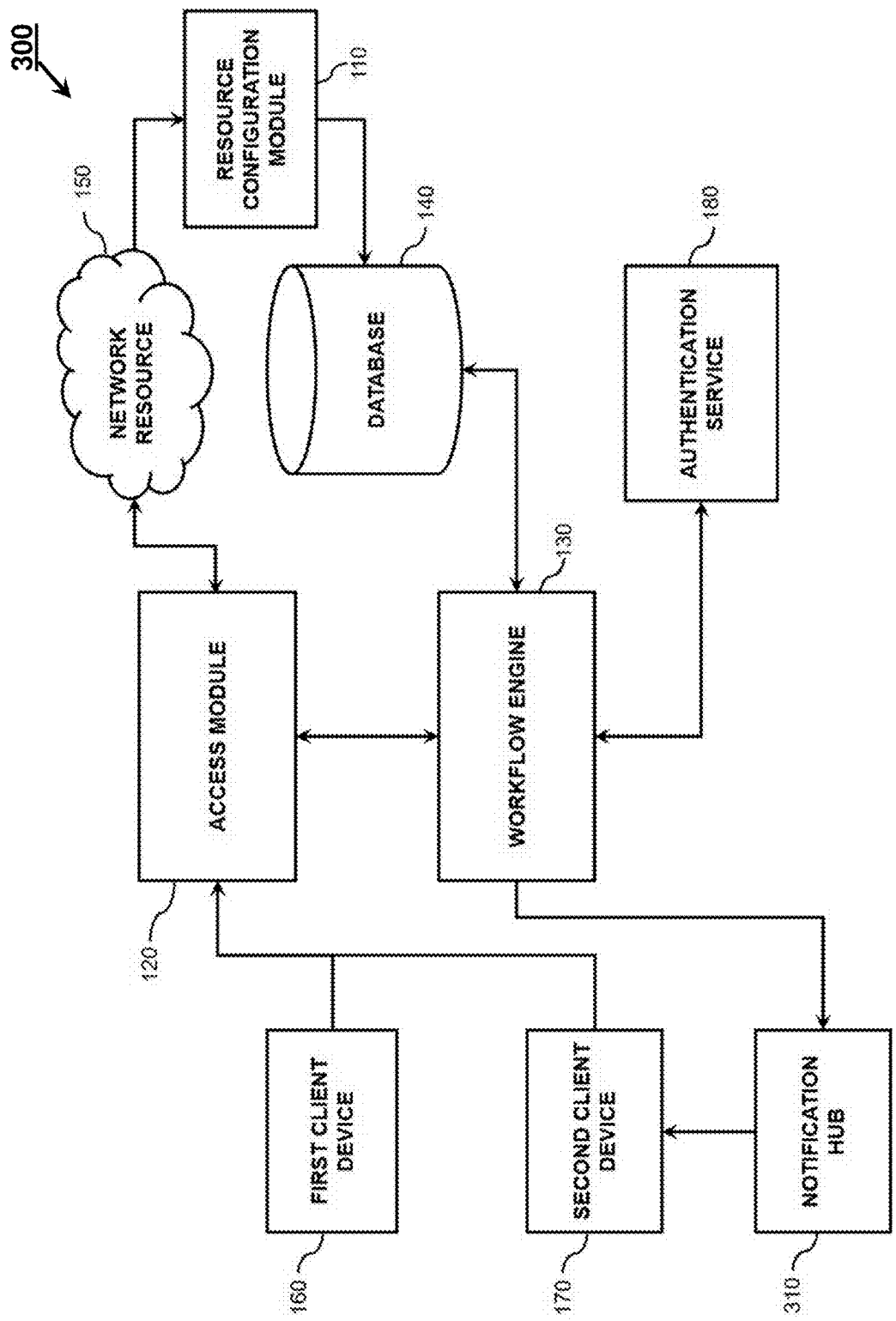
FIG. 3 illustrates the system for secure access to a network resource in accordance with yet another embodiment of the present invention.

FIG. 3 illustrates the system (100) for secure access to the network resource (150) in accordance with another embodiment (200) of the present invention. The embodiment (300) comprises a notification hub (310). The notification hub (310) is configured to provide plurality push notifications to the second client device (170) during execution of the plurality of activities, when prompted by the workflow engine (130). In accordance with an embodiment of the present invention, the plurality of push notifications is configured to notify the user to provide the password, the at least one biometric parameter and the authentication key to the access module (120) at the second client device (170).

In accordance with an embodiment of the present invention, the workflow selected by the user corresponds to one of, but not limited to, an enrolment event or an authentication event. During an enrolment event, the workflow engine (130) is configured to the store the password and the hash value at the database (140). Further, on receiving the at least one biometric parameter, the authentication service (180) generates a unique template corresponding to the user, and stores the template in a repository provided at the authentication service (180). During an authentication event, the workflow engine (130) is configured to receive and map the password and the hash value with the database (140) to authenticate the user. Further, the authentication service (180) maps the at least one biometric parameter with the template stored at the repository and returns a confidence level to the workflow engine (130). The user is successfully authenticated when the confidence level exceeds a predetermined threshold.

In accordance with an embodiment of the present invention, the database (140). Further, the database (140) is configured to process queries generated in a plurality of query languages, including, but not limited to, SQL, .QL and Datalog etc. Further, the database (140) is configured to store the user identifier, the set of workflows, the user identifier, the resource key, the interface key, the password and the hash value.

Figure 4:
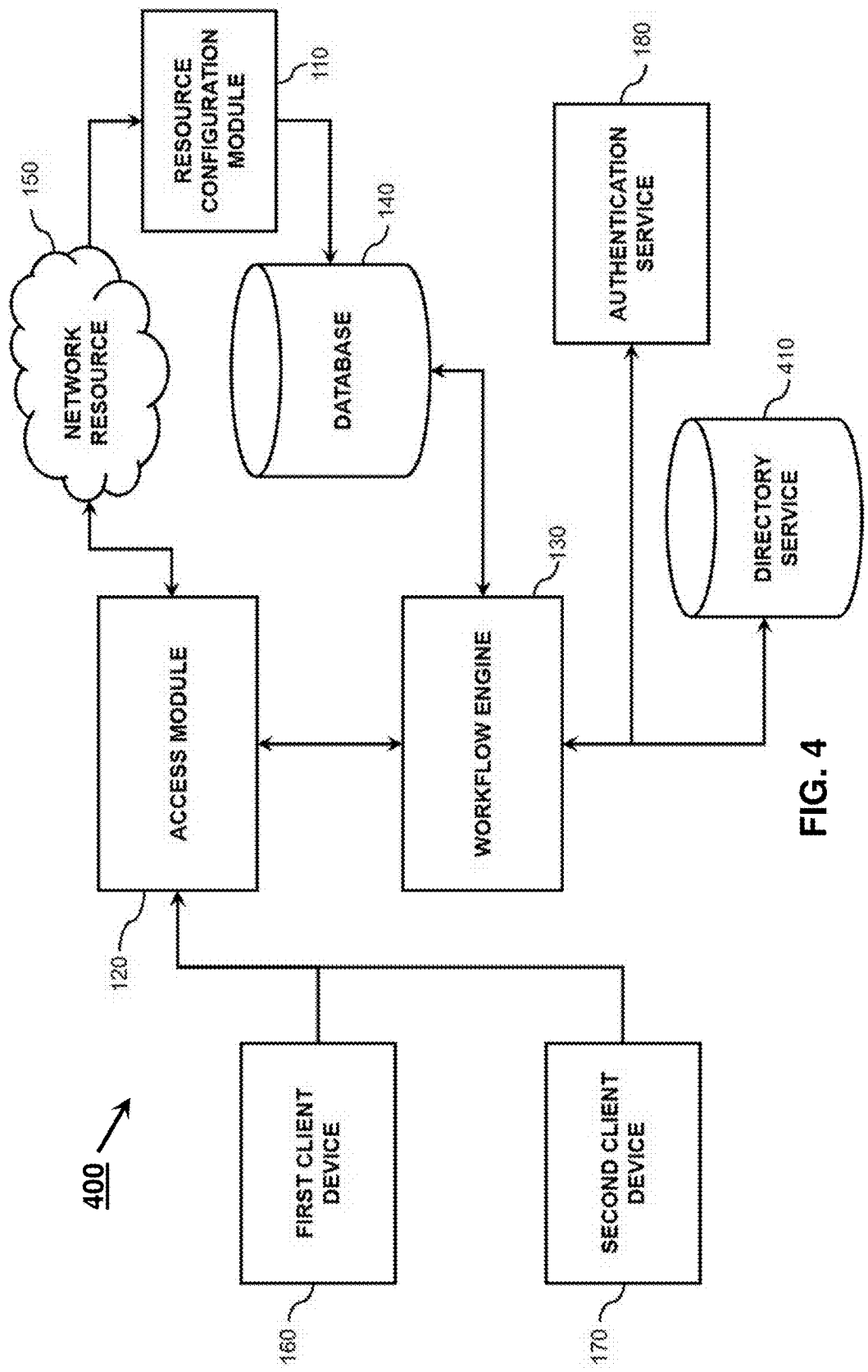
FIG. 4 illustrates the system for secure access to a network resource in accordance with yet another embodiment of the present invention.

FIG. 4 illustrates the system (100) for secure access to the network resource (150) in accordance with yet another embodiment (400) of the present invention. In accordance with the embodiment, the workflow engine (130) is configured to provide the password to a directory service (410) during the enrolment event. In accordance with an embodiment of the present invention, the directory service (410) is one of, but not limited to, Microsoft Active Directory or Lightweight Directory Access Protocol (LDAP). Further, the directory service (410) is configured to store a directory object attributed to the user identifier. When the password is provided to the directory service (410), the password is stored in association with the directory object. During the authentication event, the directory service (310) maps the password to the directory object to authenticate the user.

Figure 5:
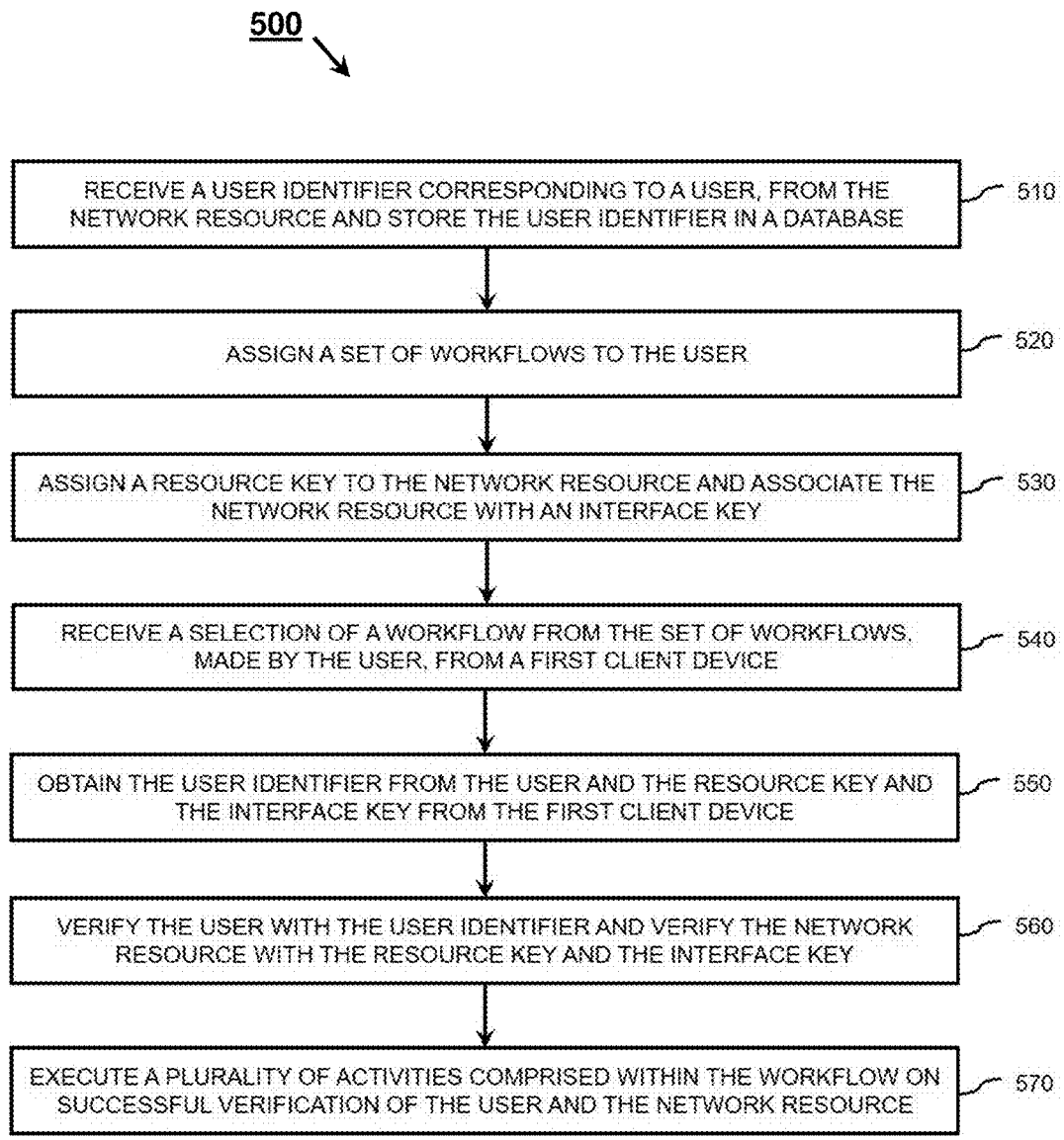
FIG. 5 illustrates a flowchart depicting a plurality of steps comprised in a method for secure access to a network resource.

FIG. 5 illustrates a plurality of steps comprised in a method (500) for secure access to a network resource (150) in accordance with an embodiment of the present invention. The method begins at step 510, by receiving a user identifier corresponding to the user, from the network resource (150) and storing the user identifier in the database (140). The user identifier is received and stored in the database (140) by the resource configuration module (110).

At step 520, a set of workflows are assigned to the user by the resource configuration module (110). In accordance with an embodiment, the user is assigned a workflow for an enrolment event and a workflow for authentication event. Alternately, the user is assigned an additional workflow in accordance with a task undertaken by the user. For example, for viewing of data, the user is authenticated with a first workflow, whereas for editing of data, the user is authenticated with a second workflow. Each workflow from the set of workflows comprises a plurality of activities. Every activity from the plurality of activities, adds another layer of security while granting access to the network resource (150).

At step 530, a resource key is assigned to the network resource (150) by the resource configuration module (110). The resource key is a unique key defined for identification of the network resource (150) and stored at the database (140). The resource key is also stored at the first client device (160) during configuration of the first client device (160). Further, the network resource (150) is associated with an interface key by the resource configuration module (110). The interface key is a unique key corresponding to the workflow engine (130) and stored at the database (140). During the configuration of system (100) for the network resource (150), the network resource (150) is associated with the interface key. The interface key allows the network resource (150) to activate the workflow engine (130). During the configuration of the first client device (160) the interface key also is stored at the first client device (160).

At step 540, a selection of a workflow from the set of workflows, made by the user, is received at the first client device (160), by the access module (120).

At step 550, the user identifier is obtained from the user and the resource key and the interface key are obtained from the first client device (160), by the access module (120). Further, user identifier, the resource key and the interface key is provided by the access module (120) to the workflow engine (130).

At step 560, the user is verified with the user identifier and the network resource is verified with the resource key and the interface key, by the workflow engine (130). The workflow engine (130) verifies the user by mapping the user identifier with the database (140). Further, the workflow engine (130) verifies the network resource (150) by mapping the network key and the interface key with the database (140).

In accordance with an embodiment, on unsuccessful verification of at least one of the user and the network resource, the workflow engine (130) flags an error message to the access module (120). The access module (120) then displays the error message to the user at, at least one of the first client device (160) and the second client device (170).

At step 570, a plurality of activities comprised within the workflow are executed by the workflow engine (130) on successful verification of the user and the network resource. The plurality of activities comprises at least one of receiving a password from the user, receiving at least one biometric parameter from the user and providing the at least one biometric parameter to an authentication service (180) and receiving an authentication key from the user. It is to be noted that the password, the at least one biometric parameter and the authentication key are received by the access module (120) from the user. The workflow module (130) only prompts the access module (120) to receive the password, the at least one biometric parameter and the authentication key from the user. Further, the at least one biometric parameter is provided to the authentication service (180) by the workflow engine (130), on receiving the at least one biometric parameter from the access module (120).

In accordance with an embodiment of the present invention, the password is received at, at least one of the first client device and the second client device. Further, in accordance with an embodiment, the at least one biometric parameter is received at, at least one of the first client device and the second client device. Further, the at least one biometric parameter is one of but not limited to, a fingerprint scan, a retina scan, a sclera scan and a plurality of behavioural characteristics of the user. The access module (120) provides the password and the at least one biometric parameter to the workflow engine (130). Also, in accordance with an embodiment of the present invention, the authentication key is received at, at least one of the first client device (160) and the second client device (170).

In accordance with an embodiment of the present invention, a plurality of push notifications is provided to the user, by the notification hub (310) at the second client device (170) during execution of the plurality of activities. The plurality of push notifications is provided by the notification hub (310) when prompted by the workflow engine (130). In accordance with an embodiment of the present invention, the plurality of push notifications is configured to notify the user to provide the password, the at least one biometric parameter and the authentication key to the access module (120) at the second client device (170).

Figure 6:
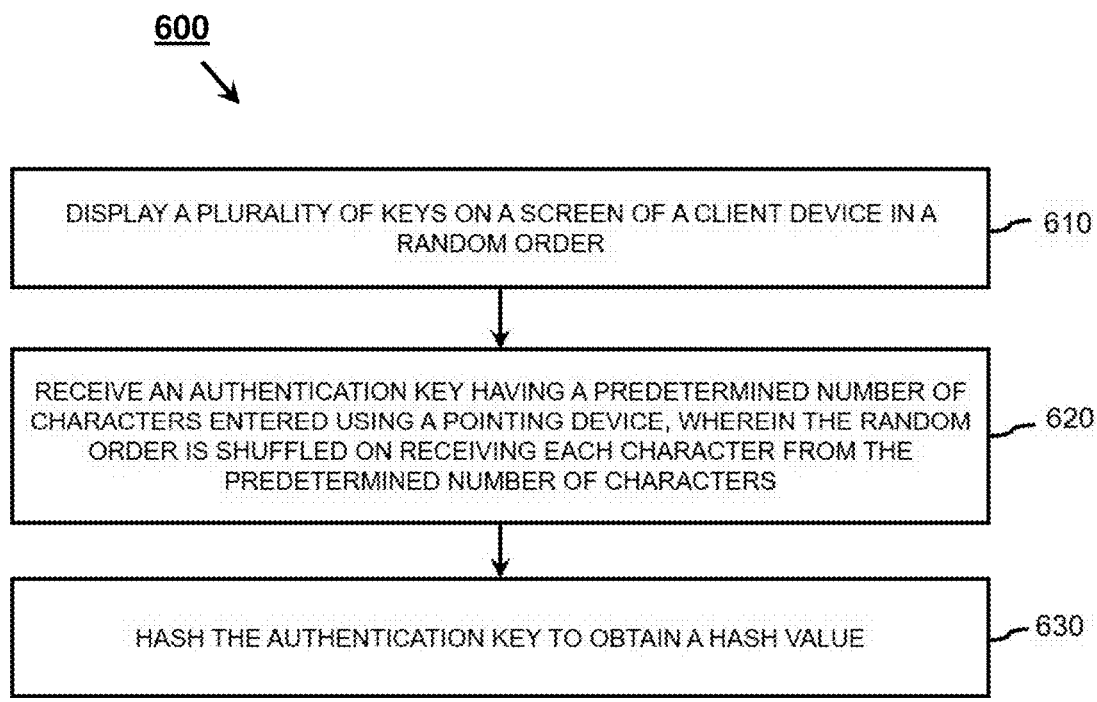
FIG. 6 illustrates a plurality of steps comprised in a method for receiving the authentication key in accordance with an embodiment of the present invention.

FIG. 6 illustrates a plurality of steps involved in a method (600) for receiving the authentication key by the access module (120) at the second client device (170), in accordance with an embodiment of the present invention.

The method begins at step 610, by displaying a plurality of keys (202) on the screen (204) of the second client device (170), by the access module (120). The plurality of keys (202) are displayed on the screen (204) having a shape of, but not limited to, a dial. Alternately, the plurality of keys (202) are displayed in a form of, but not limited to, a tree structure. In accordance with an embodiment of the present invention, the plurality of keys (202) are displayed on the screen (204) as an image map. The plurality of keys (202) are assigned a set of a plurality of respective regions on the screen (204). The x-y coordinates of the plurality of regions defining the plurality of respective keys (202) are stored in the memory (206).

At step 620, the authentication key having a predetermined number of characters is received by the access module (120). In accordance with an embodiment, the predetermined number of characters are, but not limited to, alphanumeric characters. Alternately, the predetermined number of characters comprise special characters. The predetermined number of characters are entered using the pointing device (210). When the user selects a specific area of the screen (204) with the pointing device (210), the x-y coordinates of the specific area are compared with the x-y coordinates of the plurality of regions defining the plurality of respective keys (202) to determine a character entered by the user. Further, the access module (120) shuffles the random order on receiving each character from the predetermined number of characters, i.e., the plurality of keys (202) are assigned a new set of the plurality of respective regions. The process is repeated after receiving of each character from the predetermined number of characters.

In accordance with an embodiment of the present invention, the access module (120) erases the plurality of keys (202) from the screen (204), when a character from the predetermined number of characters is not received for a predetermined period of time.

At step 630, the access module (120) hashes the authentication key to obtain a hash value. In accordance with an embodiment, the authentication key has between four and nine characters. The number of characters in the authentication key is determined by a developer or the user. The authentication key is extrapolated by the access module (120) into the hash value using a salt and a hashing algorithm. The salt is added to the authentication key to obtain a resultant string. The resultant string is then hashed using the hashing algorithm. The hashing algorithm is one of, but not limited to, MD5 or SHA etc. Alternately, the hashing algorithm is defined by the developer. In accordance with an embodiment, the hash value has a length of fifty characters.

In accordance with an embodiment of the present invention, the access module (120) is stores the hash value at the memory (206). In accordance with another embodiment, the access module (120) provides the hash value to the workflow engine (130).

In accordance with an embodiment of the present invention, the workflow selected by the user corresponds to one of, but not limited to, an enrolment event or an authentication event. During an enrolment event, the workflow engine (130) stores the password and the hash value at the database (140). Further, on receiving the at least one biometric parameter, the authentication service (180) generates a unique template corresponding to the user, and stores the template in the repository provided at the authentication service (180). During an authentication event, the workflow engine (130) receives and maps the password and the hash value with the database (140) to authenticate the user. Further, the authentication service (180) maps the at least one biometric parameter with the template stored at the repository and returns a confidence level to the workflow engine (130). The user is successfully authenticated when the confidence level exceeds a predetermined threshold.

In accordance with the embodiment, the workflow engine (130) provides the password to the directory service (410) during the enrolment event. In accordance with an embodiment of the present invention, the directory service (410) is one of, but not limited to, Microsoft Active Directory or Lightweight Directory Access Protocol (LDAP). Further, the directory service (410) stores a directory object attributed to the user identifier. When the password is provided to the directory service (410), the password is stored in association with the directory object. During the authentication event, the directory service (310) maps the password to the directory object to authenticate the user.

On successful authentication of the user, corresponding to each one of the plurality of activities comprised within the workflow, the access module (120) provides the user, with an access to the network resource (150).

Figure 7:
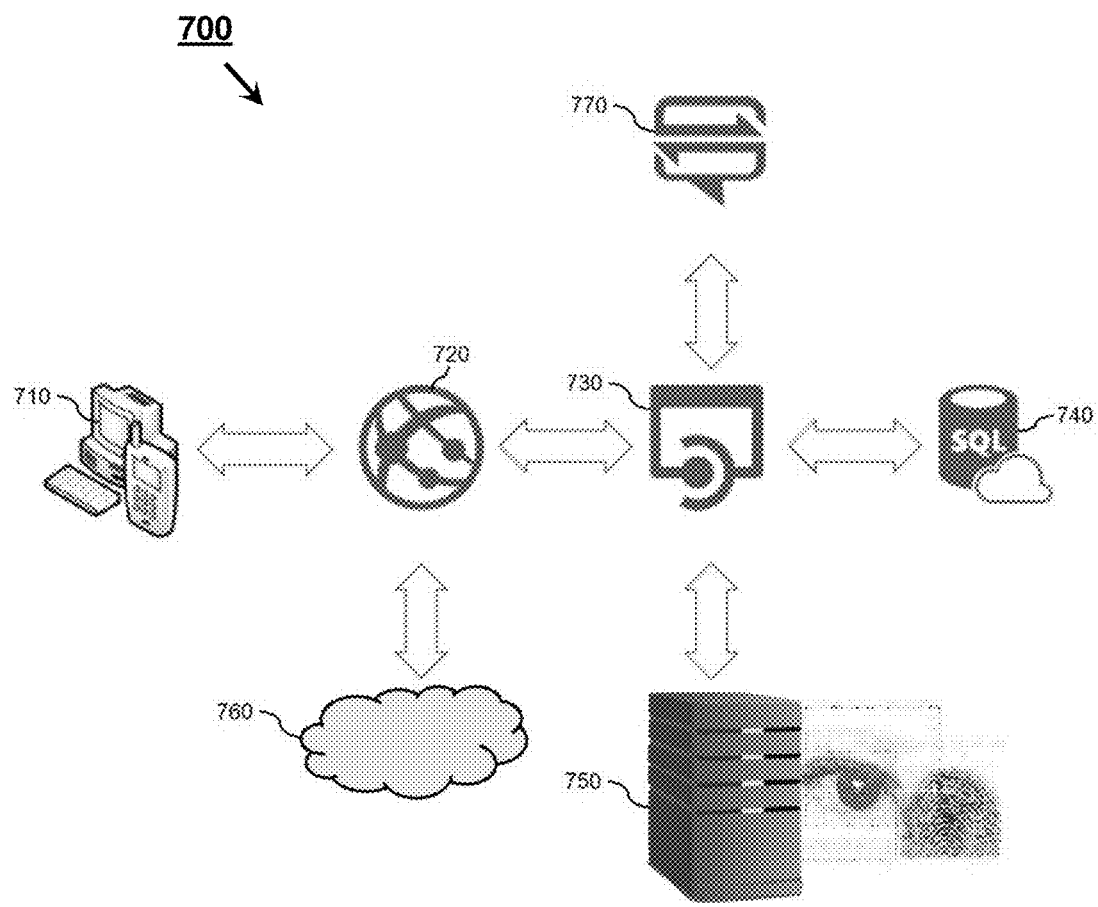
FIG. 7 illustrates an exemplary embodiment of the system for secure access to a network resource as presented in FIG. 3.

FIG. 7 illustrates an exemplary embodiment (700) of the system (100) for access to a network resource (760). The embodiment (700) comprises an access module (720) provided at a plurality of client devices (710). The access module (720) is in communication with a workflow engine (730). The workflow engine (730) is further in communication with an authentication service (750), a database (740) and a notification hub (770).

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

The invention claimed is:

1. A computer-implemented method for secure access to a network resource, comprising the steps of:

receiving a user identifier corresponding to a user, from the network resource and storing the user identifier in a database;

assigning a set of workflows, by a resource configuration module, to the user;

assigning a resource key to the network resource by the resource configuration module and associating the network resource with an interface key;

receiving a selection of a workflow from the set of workflows, made by the user, from a first client device;

obtaining the user identifier from the user and the resource key and the interface key from the first client device;

verifying the user with the user identifier and verifying the network resource with the resource key and the interface key by a workflow engine; and executing a plurality of activities comprised within the workflow on successful verification of the user and the network resource;

the resource key is a unique key defined for identification of the network resource and stored at the database; the resource key is also stored at the first client device during configuration of the first client device; the interface key is a unique key corresponding to the workflow engine and stored at the database; the workflow engine is comprised of the user identifier; the user is verified by mapping the user identifier with the database; the workflow engine is also comprised of the network key for verifying the network resource and the interface key by mapping the resource key and the interface key with the database;

wherein the plurality of activities comprise at least one of:
receiving a password from the user;
receiving at least one biometric parameter from the user and providing the user at least one biometric parameter to an authentication service;
receiving an authentication key from the user.

* * * * *